United States Patent
Li et al.

(10) Patent No.: US 12,114,594 B2
(45) Date of Patent: Oct. 15, 2024

(54) MULTI-CROP ADAPTIVE SEED DELIVERY AND UNIFORM SEED DISTRIBUTION DEVICE

(71) Applicant: SHANDONG ACADEMY OF AGRICULTURAL MACHINERY SCIENCES, Shandong (CN)

(72) Inventors: Qinglong Li, Jinan (CN); Yitian Sun, Jinan (CN); Qinghai He, Jinan (CN); Jinying Bi, Jinan (CN); Ming Zhong, Jinan (CN)

(73) Assignee: SHANDONG ACADEMY OF AGRICULTURAL MACHINERY SCIENCES, Jinan (CN)

( * ) Notice: Subject to any disclaimer, the term of this patent is extended or adjusted under 35 U.S.C. 154(b) by 0 days.

(21) Appl. No.: 18/280,344

(22) PCT Filed: Mar. 12, 2021

(86) PCT No.: PCT/CN2021/080335
§ 371 (c)(1),
(2) Date: Sep. 5, 2023

(87) PCT Pub. No.: WO2022/188118
PCT Pub. Date: Sep. 15, 2022

(65) Prior Publication Data
US 2024/0074346 A1    Mar. 7, 2024

(30) Foreign Application Priority Data

Mar. 11, 2021   (CN) .......................... 202110264173.4

(51) Int. Cl.
*A01C 7/08* (2006.01)
*A01C 15/00* (2006.01)
(Continued)

(52) U.S. Cl.
CPC ............ *A01C 7/084* (2013.01); *A01C 15/007* (2013.01); *A01C 15/04* (2013.01); *B65G 53/06* (2013.01); *B65G 53/528* (2013.01)

(58) Field of Classification Search
None
See application file for complete search history.

(56) References Cited

U.S. PATENT DOCUMENTS 4,569,486 A * 2/1986 Balmer .................. A01C 15/04
                                              239/522
5,024,356 A * 6/1991 Gerling .................. A01C 7/102
                                              222/312

(Continued)

FOREIGN PATENT DOCUMENTS

CN      101953247 A      1/2011
CN      204907074 U     12/2015
(Continued)

OTHER PUBLICATIONS

May 13, 2021 International Search Report issued in International Patent Application No. PCT/CN2021/080335.
(Continued)

*Primary Examiner* — Joseph A Dillon, Jr.
(74) *Attorney, Agent, or Firm* — Oliff PLC

(57) ABSTRACT

A multi-crop adaptive seed delivery and uniform seed distribution device, including: a seed storage box, a seed metering mechanism, a seed distributor lower housing, a seed distributor upper housing, and a blade driving mechanism. Closed accommodating cavity is formed between the seed distributor upper and lower housing; N seed guide tubes are arranged in circumferential direction, N being positive integer equal to or greater than 2; N blades are rotatably mounted in accommodating cavity; blades are arranged in vertical direction; closed independent seed guide cavity is divided in accommodating cavity by two adjacent (Continued)

blades; upper end of each seed guide tube is connected with corresponding seed guide cavity; top of seed distributor upper housing is divided into N fan-shaped areas in circumferential direction; upper end of each blade is connected to edge of corresponding fan-shaped area by means of elastic piece; and collision sensor is provided in each fan-shaped area.

6 Claims, 4 Drawing Sheets

(51) Int. Cl.
    *A01C 15/04*     (2006.01)
    *B65G 53/06*     (2006.01)
    *B65G 53/52*     (2006.01)

(56) References Cited

U.S. PATENT DOCUMENTS

| | | | |
|---|---|---|---|
| 5,028,009 A | 7/1991 | Takata | |
| 5,775,585 A * | 7/1998 | Duello | A01C 15/04 |
| | | | 239/654 |
| 10,051,781 B2 * | 8/2018 | Beaujot | A01C 7/084 |
| 10,321,624 B2 * | 6/2019 | Reich | H04L 67/12 |
| 10,779,460 B2 * | 9/2020 | Pirkenseer | A01C 7/084 |
| 10,918,011 B1 * | 2/2021 | Li | A01C 19/02 |
| 11,284,560 B2 * | 3/2022 | Cowan | A01C 7/082 |
| 11,583,880 B2 * | 2/2023 | Hüdepohl | A01C 21/00 |
| 11,751,502 B2 * | 9/2023 | Riffel | A01C 7/105 |
| | | | 239/8 |
| 2016/0157417 A1 | 6/2016 | Funck | |
| 2017/0156258 A1 * | 6/2017 | Reich | A01C 7/084 |
| 2023/0371420 A1 * | 11/2023 | Riffel | A01C 7/102 |

FOREIGN PATENT DOCUMENTS

| | | | | |
|---|---|---|---|---|
| CN | 105453774 A | | 4/2016 | |
| CN | 209749116 U | | 12/2019 | |
| CN | 113692813 A | * | 11/2021 | |
| DE | 19946410 A1 | * | 4/2001 | A01C 7/082 |
| DE | 102022125776 A1 | * | 4/2024 | A01C 7/081 |
| EP | 3 653 035 A1 | | 5/2020 | |
| EP | 4230019 A1 | * | 8/2023 | A01C 15/04 |
| FR | 3050902 A1 | * | 11/2017 | A01C 15/04 |

OTHER PUBLICATIONS

May 13, 2021 Written Opinion issued in International Patent Application No. PCT/CN2021/080335.

* cited by examiner

MULTI-CROP ADAPTIVE SEED DELIVERY AND UNIFORM SEED DISTRIBUTION DEVICE

TECHNICAL FIELD

The present disclosure relates to the technical field of seeders, and in particular, to a multi-crop adaptive seed delivery and uniform seed distribution device.

BACKGROUND

The crop seeding operations are divided into two ways: single-seed precision seeding and strip seeding. Conventional wheat, quinoa, *Sesbania cannabina* and other small-particle size crops are mainly seeded in strip and scatter. A pneumatic centralized delivery seeder is currently the most advanced grain strip seeding machine in the world with high delivery efficiency and suitable for the precision seeding operation requirements. The consistency of the seed metering quantity is an important indicator of evaluating the quality of the seeder operation. The better the consistency, the more uniform the seeding, the better the growth of the crops in the later period, and the higher the output of farmland. Due to the effects of difference including different seed varieties, sizes, quality, vibration of the whole machine, and delivery air pressures, a conventional pneumatic centralized delivery way has an undesirable effects of seeding quantity control and uniform seed distribution and poor consistency of the seed metering quantity in rows.

SUMMARY

In order to overcome the above technical deficiencies, the present disclosure provides a multi-crop adaptive seed delivery and uniform seed distribution device for improving the consistency of seed metering in rows and precisely controlling the seeding quantity.

The technical solutions adopted by the present disclosure to overcome the technical problems are as follows.

A multi-crop adaptive seed delivery and uniform seed distribution device, including:

a seed storage box, configured to store seeds, a seed metering box being connected in a closed manner below the seed storage box;

a seed metering mechanism, provided in a connection of the seed metering box and the seed storage box, where the seed metering mechanism quantitatively delivers the seeds in the seed storage box to the seed metering box, an inlet end on one side of the seed metering box is connected to an electric fan, and an outlet end on an other side of the seed metering box is connected to a delivery tube;

a seed distributor lower housing, being a disk-shaped mechanism, where a middle portion of the seed distributor lower housing is connected to an other end of the delivery tube;

a seed distributor upper housing, fixed at an opening in an upper end of the seed distributor lower housing in a snapping manner, where a closed accommodating cavity is formed between the seed distributor upper housing and the seed distributor lower housing, and N seed guide tubes are arranged in a circumferential direction, N being a positive integer equal to or greater than 2; N blades are rotatably mounted in the accommodating cavity; the blades are arranged in a vertical direction; a closed independent seed guide cavity is divided in the accommodating cavity by two adjacent blades; an upper end of each seed guide tube is connected with a corresponding seed guide cavity; a top of the seed distributor upper housing is divided into N fan-shaped areas in the circumferential direction; an upper end of each blade is connected to an edge of a corresponding fan-shaped area by means of an elastic piece; and a collision sensor is provided in each fan-shaped area; and a blade driving mechanism, for driving the elastic piece to rotate, so as to change an included angle between two adjacent elastic pieces.

Further, the above seed metering mechanism includes a seed metering wheel with a horizontal rotation mechanism mounted in a connection of the seed metering box and the seed storage box, the seed metering box is provided with a seed metering motor, an output axle of the seed metering motor is in coaxial transmission connection with the seed metering wheel, and several grooves are evenly distributed along the circumference on the seed metering wheel.

Further, 8 blades are rotatably provided in the above accommodating cavity; the blade driving mechanism includes a box body mounted in an upper end of the seed distributor upper housing through a rack, a hollow wheel axle I rotatably mounted in the box body through a bearing in the vertical direction, a hollow wheel axle II rotatably mounted in the box body through the bearing and coaxially mounted in the hollow wheel axle I in an inserting manner, a hollow wheel axle ill rotatably mounted in the box body through the bearing and coaxially mounted in the hollow wheel axle II in an inserting manner and a wheel axle rotatably mounted in the box body through the bearing and coaxially mounted in the hollow wheel axle III in an inserting manner; the hollow wheel axle I, the hollow wheel axle II, the hollow wheel axle III and the wheel axle are all driven by a wheel axle driving device to rotate; two ends of the hollow wheel axle I are symmetrically provided with a first blade respectively, the hollow wheel axle I is symmetrically provided with two first arc grooves, two ends of the hollow wheel axle II are symmetrically provided with a second blade respectively, the second blade passes through the first arc groove, the hollow wheel axle II is symmetrically provided with two second arc grooves, two ends of the hollow wheel axle III are symmetrically provided with a third blade respectively, the third blade passes through the second arc groove and the first arc groove respectively, the hollow wheel axle III is symmetrically provided with two third arc grooves, two ends of the wheel axle are symmetrically provided with a fourth blade respectively, and the fourth blade passes through the third arc groove, the second arc groove and the first arc groove respectively; and the first blade, the second blade, the third blade and the fourth blade are alternately arranged in intervals in the circumferential direction.

Further, the above wheel axle driving device includes a motor mounted in the box body and a master gear mounted on an output axle of the motor, the hollow wheel axle I, the hollow wheel axle II, the hollow wheel axle III and the wheel axle are all provided with a slave gear, and the slave gear engages with a corresponding master gear.

In order to improve the smoothness of seed guiding, a lower end of the above hollow wheel axle I is coaxially with an obconical seed distributing head.

In order to avoid dust ingress, outer sides of the first blade, the second blade, the third blade and the fourth blade are fixed with a soft rubber sleeve in a wrapping manner.

The beneficial effects of the present disclosure are as follows: The seed metering mechanism acts to discharge the seeds in the seed storage box to an air cavity of the seed metering box, the electric fan acts at the same time, and the seeds are delivered to the seed guide cavity formed between blades through the delivery tube under the action of the air flow discharged by the electric fan. Since the upper end of the blade is connected to the top of the seed distributor upper housing through the elastic piece, the seeds in each seed guide cavity are discharged through the seed guide tube. The seeds inputted in each seed guide cavity hit the collision sensor to generate voltage signals in corresponding quantities and different sizes, the seed metering quantity in each seed guide tube may be obtained according to the collision sensor, and the blade is driven to rotate through the blade driving mechanism. As a result, the included angle between the blades changes, the volume of the seed guide cavity changes, and thus the purpose of adjusting the quantity of seeds entering a channel is achieved. Then seed distribution operation is completed in rows. The consistency of seed metering is improved in rows, and the seeding quantity is precisely controlled.

In the figures, 1, delivery tube; 2, seed guide tube; 3, blade; 4, elastic piece; 5, seed distributor lower housing; 6, seed distributor upper housing; 7, collision sensor; 8, motor; 9, bearing; 10, box body; 11, rack; 12, seed storage box; 13, seed metering wheel; 14, seed metering motor; 15, seed metering box; 16, electric fan; 17, seed distributing head; 18, hollow wheel axle I; 19, hollow wheel axle II; 20, hollow wheel axle III; 21, wheel axle; 22, master gear; 31, first blade; 32, second blade; 33, third blade; 34, first arc groove; 35, second arc groove; 36, third arc groove; 37, fourth blade; and 38, soft rubber sleeve.

DETAILED DESCRIPTION

Figure 1:
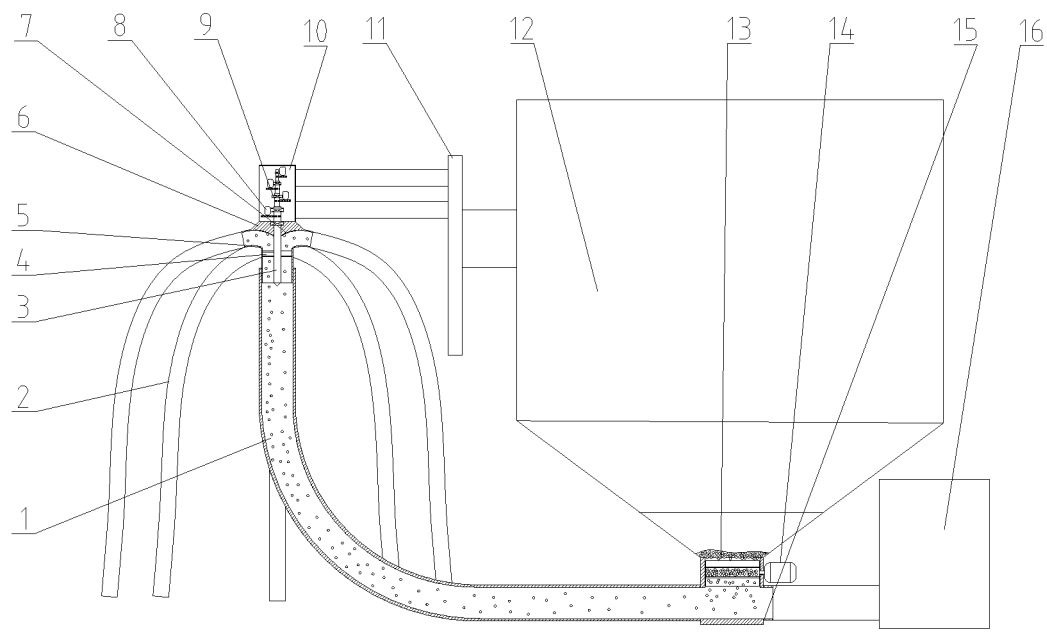
FIG. 1 is a front schematic structural view of the present disclosure.
Figure 2:
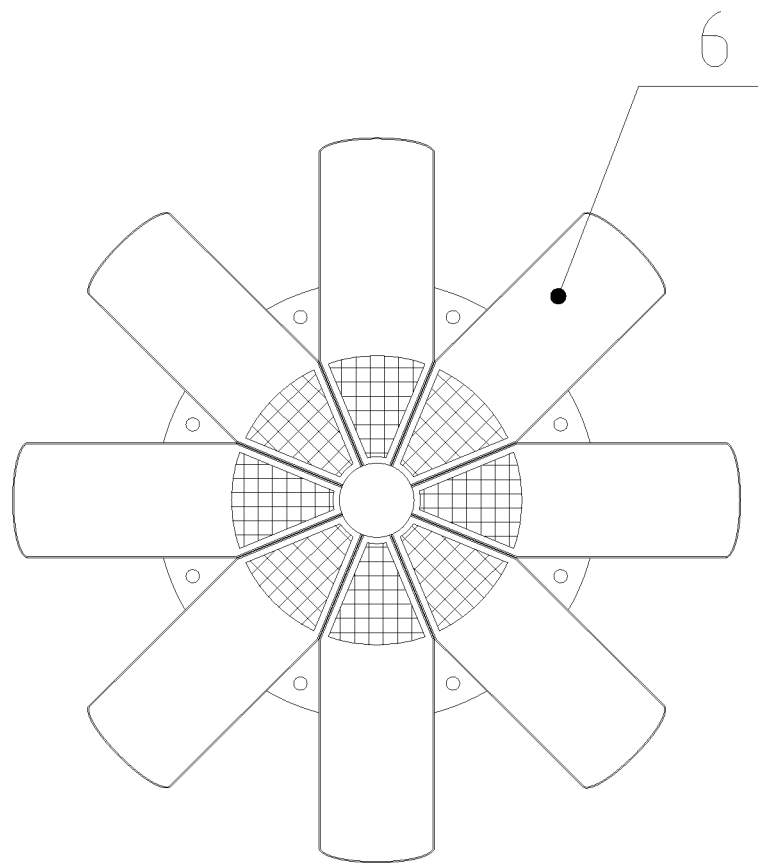
FIG. 2 is an enlarged schematic structural view of a seed distributor upper housing.
Figure 3:
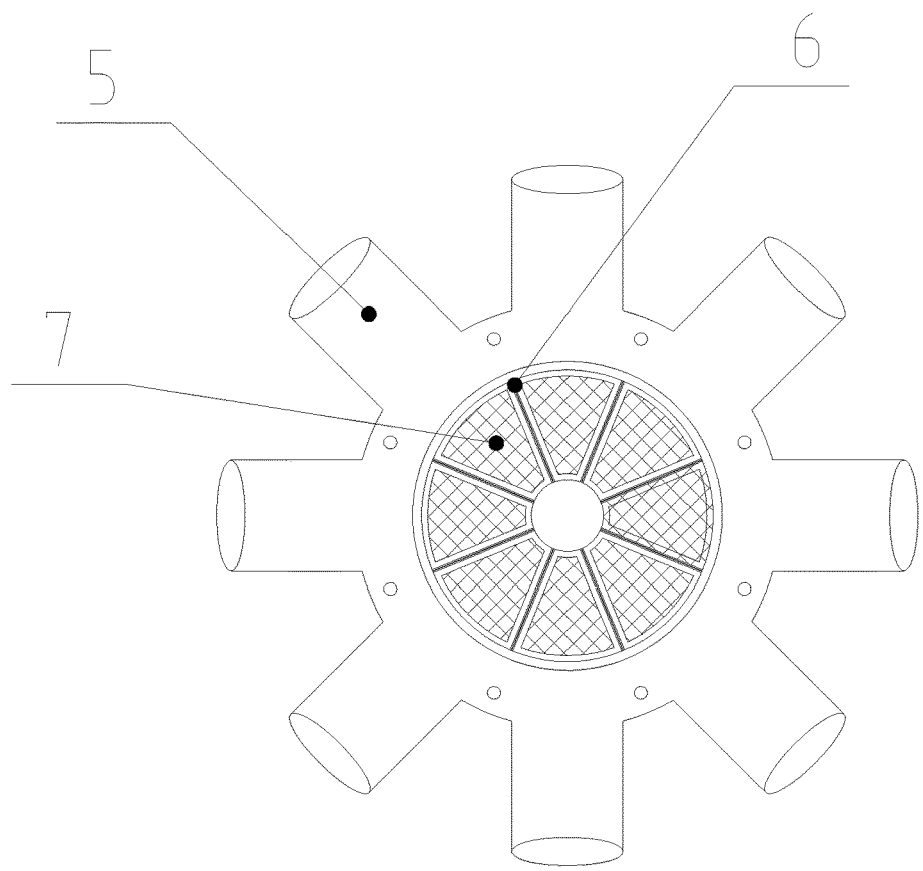
FIG. 3 is an enlarged schematic structural view of a seed distributor lower housing.
Figure 4:
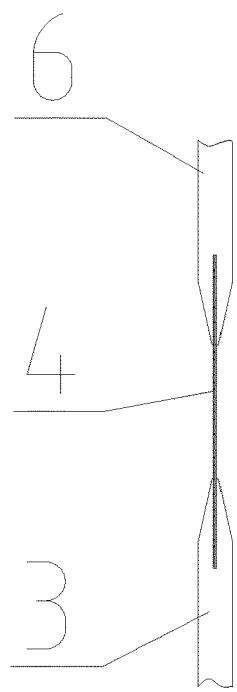
FIG. 4 is an enlarged schematic structural view of an elastic piece.
Figure 5:
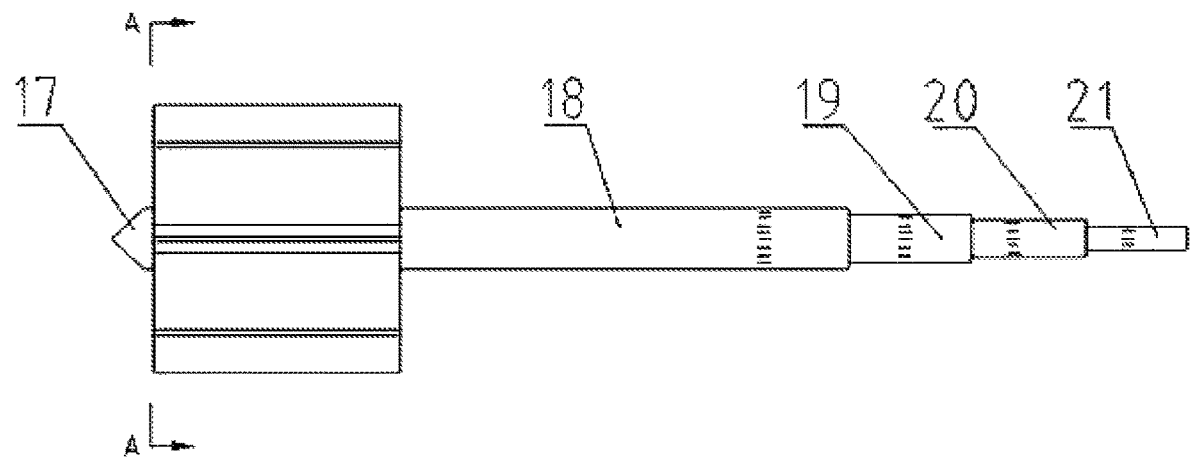
FIG. 5 is a schematic structural view of a hollow wheel axle.
Figure 6:
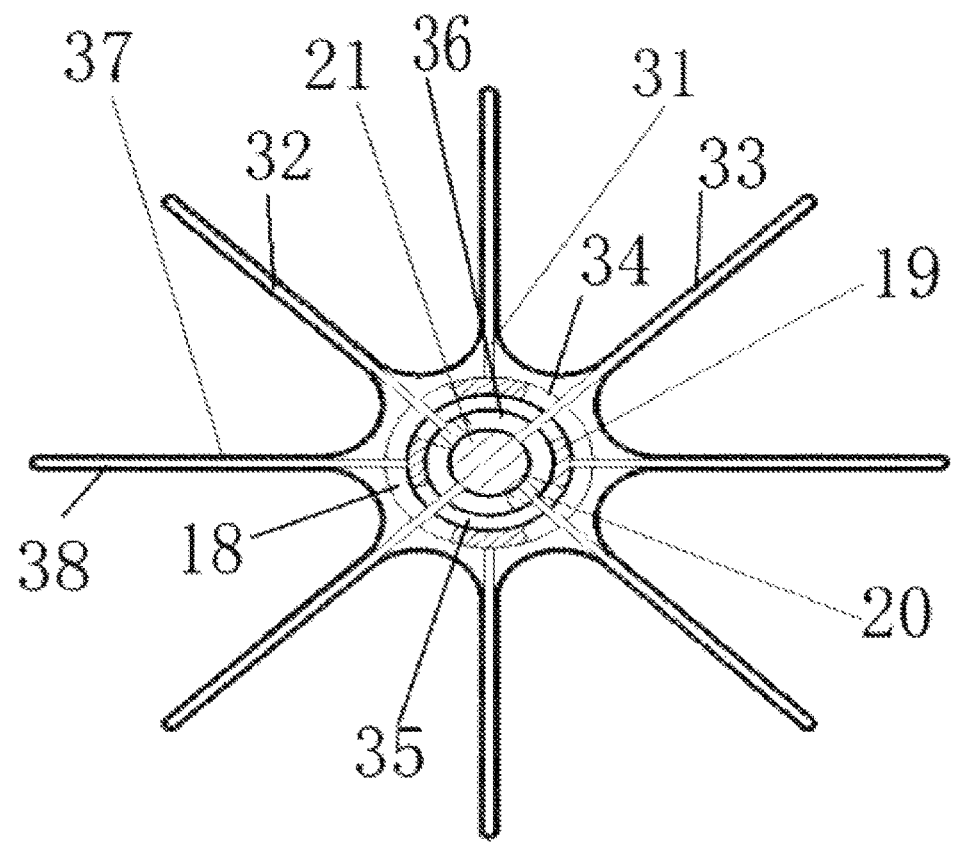
FIG. 6 is a top schematic cross-sectional view of a first blade, a second blade, and a third blade.
Figure 7:
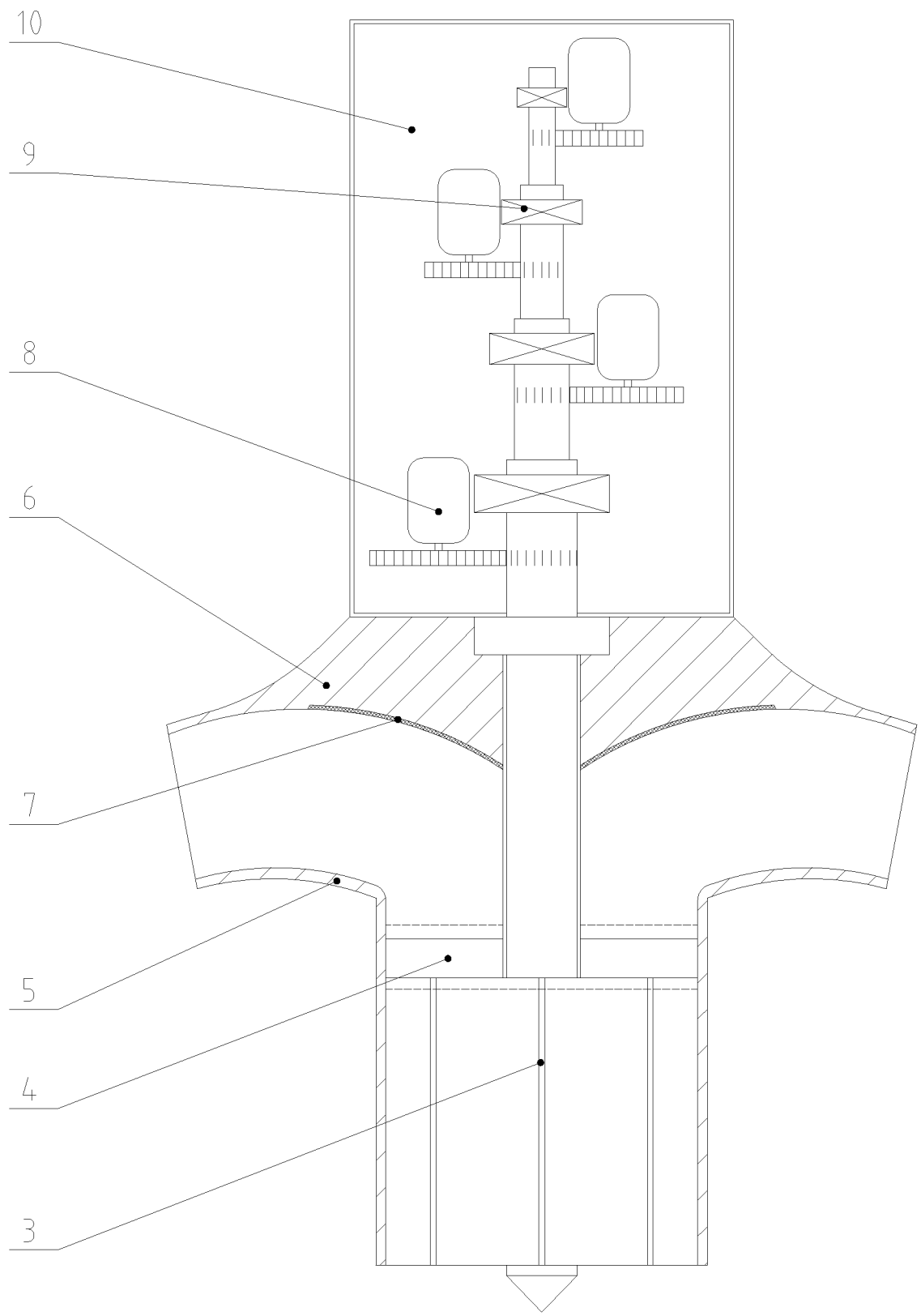
FIG. 7 is a schematic structural view of an electric seed distributor.

The present disclosure is further described in combination with FIG. 1 to FIG. 7.

A multi-crop adaptive seed delivery and uniform seed distribution device, including: a seed storage box 12, configured to store seeds, a seed metering box 15 being connected in a closed manner below the seed storage box 12; a seed metering mechanism, provided in a connection of the seed metering box 15 and the seed storage box 12, where the seed metering mechanism quantitatively delivers the seeds in the seed storage box 12 to the seed metering box 15, an inlet end on one side of the seed metering box 15 is connected to an electric fan 16, and an outlet end on an other side of the seed metering box is connected to a delivery tube 1; a seed distributor lower housing 5, being a disk-shaped mechanism, where a middle portion of the seed distributor lower housing 5 is connected to an other end of the delivery tube 1; a seed distributor upper housing 6, fixed at an opening in an upper end of the seed distributor lower housing 5 in a snapping manner, where a closed accommodating cavity is formed between the seed distributor upper housing 6 and the seed distributor lower housing 5, and N seed guide tubes 2 are arranged in a circumferential direction, N being a positive integer equal to or greater than 2; N blades 3 are rotatably mounted in the accommodating cavity; the blades 3 are arranged in a vertical direction; a closed independent seed guide cavity is divided in the accommodating cavity by two adjacent blades 3; an upper end of each seed guide tube 2 is connected with a corresponding seed guide cavity; a top of the seed distributor upper housing 6 is divided into N fan-shaped areas in the circumferential direction; an upper end of each blade 3 is connected to an edge of a corresponding fan-shaped area by means of an elastic piece 4; and a collision sensor 7 is provided in each fan-shaped area; and a blade driving mechanism, for driving the elastic piece 4 to rotate, so as to change an included angle between two adjacent elastic pieces 4. The seed metering mechanism acts to discharge the seeds in the seed storage box 12 to an air cavity of the seed metering box 15 from the seed storage box 12, the electric fan 16 acts at the same time, and the seeds are delivered to the seed guide cavity formed between blades 3 through the delivery tube 1 under the action of the air flow discharged by the electric fan 16. Since the upper end of the blade 3 is connected to a top of the seed distributor upper housing 6 through the elastic piece 4, the seeds in each seed guide cavity are discharged through the seed guide tube 2. The seeds inputted in each seed guide cavity hit the collision sensor 7 to generate voltage signals in corresponding quantities and different sizes, the seed metering quantity in each seed guide tube 2 may be obtained according to the collision sensor 7, and the blade 3 is driven to rotate through the blade driving mechanism. As a result, the included angle between the blades 3 changes, the volume of the seed guide cavity changes, and thus the purpose of adjusting the quantity of seeds entering a channel is achieved. When the blade 3 rotates, the elastic piece 4 incurs elastic deformation, always ensuring the closeness of each seed guide cavity. Then seed distribution operation is completed in rows. The consistency of seed metering is improved in rows, and the seeding quantity is precisely controlled. According to the collision sensor 7, the rotation speed of the electric fan 16 may also be adjusted through testing the intensity of a collision signal, and thus the purpose of adjusting the air pressure is achieved, accommodating seeds in different sizes, and preventing the seeds from hitting the collision sensor 7 in a too large force due to a too high air flow speed causing a seed damaging case. An air flow in a too low speed cannot achieve the purpose of fast delivery. The total seed delivery quantity per unit time (i.e., the seeding quantity per unit time) in the delivery tube 1 may be obtained according to the quantity of collision signals of all the collision sensors 7 and the frequencies. In combination with the operation speed of a seeder and a set seeding quantity per mu, the rotation speed of the seed metering motor 14 is adjusted in real time, so that the seed delivery quantity per unit time in the delivery tube 1 matches a converted value of the set seeding quantity per mu, achieving the purpose of precise control of the seeding quantity.

The seed metering mechanism may have the following structure: including a seed metering wheel 13 with a horizontal rotation mechanism mounted on the connection of the seed metering box 15 and the seed storage box 12, the seed metering box 15 is provided with a seed metering motor 14, an output axle of the seed metering motor 14 is in coaxial transmission connection with the seed metering wheel 13, and several grooves are evenly distributed along the circumference on the seed metering wheel 13. The seed metering motor 14 drives the seed metering wheel 13 to rotate. Since the seed metering wheel 13 is uniformly provided with grooves, each groove directly facing the seed storage box 12 may store a set quantity of seeds, and the seeds in the groove fall in the seed metering box 15 along with rotation of the seed metering wheel 13.

8 blades are rotatably provided in the accommodating cavity. The blade driving mechanism may include a box body 10 mounted in an upper end of the seed distributor upper housing 6 through a rack 11, a hollow wheel axle I 18 rotatably mounted in the box body 10 through a bearing 9 in the vertical direction, a hollow wheel axle II 19 rotatably mounted in the box body 10 through the bearing 9 and coaxially mounted in the hollow wheel axle I 18 in an inserting manner, a hollow wheel axle III 20 rotatably mounted in the box body 10 through the bearing 9 and coaxially mounted in the hollow wheel axle II 19 in an inserting manner and a wheel axle 21 rotatably mounted in the box body 10 through the bearing 9 and coaxially mounted in the hollow wheel axle III 20 in an inserting manner. The hollow wheel axle I 18, the hollow wheel axle II 19, the hollow wheel axle III 20 and the wheel axle 21 are all driven by a wheel axle driving device to rotate. Two ends of the hollow wheel axle I 18 are symmetrically provided with a first blade 31 respectively, and the hollow wheel axle I 18 is symmetrically provided with two first arc grooves 34. Two ends of the hollow wheel axle II 19 are symmetrically provided with a second blade 32 respectively, the second blade 32 passes through the first arc groove 34, and the hollow wheel axle II 19 is symmetrically provided with two second arc grooves 35. Two ends of the hollow wheel axle III 20 are symmetrically provided with a third blade 33 respectively, the third blade 33 passes through the second arc groove 35 and the first arc groove 34 respectively, and the hollow wheel axle III 20 is symmetrically provided with two third arc grooves 36. Two ends of the wheel axle 21 are symmetrically provided with a fourth blade 37 respectively, and the fourth blade 37 passes through the third arc groove 36, the second arc groove 35 and the first arc groove 34 respectively. The first blade 31, the second blade 32, the third blade 33 and the fourth blade 37 are alternately arranged in intervals in the circumferential direction. When the wheel axle driving device drives the hollow wheel axle I 1S, the first blade 31 is then driven to rotate. When the wheel axle driving device drives the hollow wheel axle II 19, the second blade 32 is then driven to rotate. When the wheel axle driving device drives the hollow wheel axle III 20, the third blade 33 is then driven to rotate. When the wheel axle driving device drives the wheel axle 21, the fourth blade 37 is then driven to rotate. When the first blade 31, the second blade 32, the third blade 33 and the fourth blade 37 rotate. As a result, the included angle therebetween changes, the volume of the seed guide cavity changes, and thus control of the quantity of seeds in each seed guide tube 2 is achieved.

Further, the wheel axle driving device includes a motor 8 mounted in the box body 10 and a master gear 22 mounted on an output axle of the motor 8. The hollow wheel axle I 18, the hollow wheel axle II 19, the hollow wheel axle III 20 and the wheel axle 21 are all provided with a slave gear. The slave gear engages with a corresponding master gear 22. The motor 8 rotates to drive the master gear 22 to rotate. Since the master gear 22 engages with the slave gear, the hollow wheel axle I 18, the hollow wheel axle II 19, the hollow wheel axle III 20 and the wheel axle 21 are driven to rotate. Preferably, a lower end of the above hollow wheel axle I 18 is coaxially with an obconical seed distributing head 17. Through the obconical seed distributing head 17, the seeds delivered in the delivery tube 1 may be guided downward into a corresponding seed guide cavity via the cone of the seed distributing head 17. The seed distributing head 17 may seal an opening in the axial end of the hollow wheel axle III 20, preventing the seeds from hitting the axial end of the hollow wheel axle III 20, and preventing dust from entering the hollow wheel axle III 20.

Further, outer sides of the first blade 31, the second blade 32, the third blade 33 and the fourth blade 37 are fixed with a soft rubber sleeve 38 in a wrapping manner. The soft rubber sleeve 38 wraps the outer sides of the first blade 31, the second blade 32, the third blade 33 and the fourth blade 37 in the circumferential direction, so that the hollow wheel axle I 18, the hollow wheel axle II 19, the hollow wheel axle III 20 and the wheel axle 21 are sealed, preventing dust from entering the hollow wheel axle I 18, the hollow wheel axle II 19 and the hollow wheel axle III 20 from the first arc groove 34, the second arc groove 35 and the third arc groove 36.

It is to be noted at last that: the above are merely preferred embodiments of the present disclosure and are not intended to limit the present disclosure. Although the present disclosure has been described in detail with reference to the aforementioned embodiments, it is still possible for those skilled in the art to modify the technical solutions described in the aforementioned embodiments or to equivalently replace some of their technical features. Any modifications, equivalent replacements, improvements and the like made within the spirit and principle of the present disclosure shall be included within the scope of protection of the present disclosure.

What is claimed is:

1. A multi-crop adaptive seed delivery and uniform seed distribution device, comprising:
    a seed storage box, configured to store seeds, a seed metering box being connected in a closed manner below the seed storage box;
    a seed metering mechanism, provided in a connection of the seed metering box and the seed storage box, wherein the seed metering mechanism quantitatively delivers the seeds in the seed storage box to the seed metering box, an inlet end on one side of the seed metering box is connected to an electric fan, and an outlet end on an other side of the seed metering box is connected to a delivery tube;
    a seed distributor lower housing, being a disk-shaped mechanism, wherein a middle portion of the seed distributor lower housing is connected to an other end of the delivery tube;
    a seed distributor upper housing, fixed at an opening in an upper end of the seed distributor lower housing in a snapping manner, wherein a closed accommodating cavity is formed between the seed distributor upper housing and the seed distributor lower housing, and N seed guide tubes are arranged in a circumferential direction, N being a positive integer equal to or greater than 2; N blades are rotatably mounted in the accommodating cavity; the blades are arranged in a vertical direction; a closed independent seed guide cavity is divided in the accommodating cavity by two adjacent blades; an upper end of each seed guide tube is connected with a corresponding seed guide cavity; a top of the seed distributor upper housing is divided into N fan-shaped areas in the circumferential direction; an upper end of each blade is connected to an edge of a corresponding fan-shaped area by means of an elastic piece; and a collision sensor is provided in each fan-shaped area; and a blade driving mechanism, for driving the elastic piece to rotate, so as to change an included angle between two adjacent elastic pieces.

2. The multi-crop adaptive seed delivery and uniform seed distribution device according to claim 1, wherein the seed metering mechanism comprises a seed metering wheel with a horizontal rotation mechanism mounted in a connection of the seed metering box and the seed storage box, the seed metering box is provided with a seed metering motor, an output axle of the seed metering motor is in coaxial transmission connection with the seed metering wheel, and several grooves are evenly distributed along the circumference on the seed metering wheel.

3. The multi-crop adaptive seed delivery and uniform seed distribution device according to claim 1, wherein 8 blades are rotatably provided in the accommodating cavity; the blade driving mechanism comprises a box body mounted in an upper end of the seed distributor upper housing through a rack, a hollow wheel axle I rotatably mounted in the box body through a bearing in the vertical direction, a hollow wheel axle II rotatably mounted in the box body through the bearing and coaxially mounted in the hollow wheel axle I in an inserting manner, a hollow wheel axle III rotatably mounted in the box body through the bearing and coaxially mounted in the hollow wheel axle II in an inserting manner and a wheel axle rotatably mounted in the box body through the bearing and coaxially mounted in the hollow wheel axle III in an inserting manner; the hollow wheel axle I, the hollow wheel axle II, the hollow wheel axle III and the wheel axle are all driven by a wheel axle driving device to rotate; two ends of the hollow wheel axle I are symmetrically provided with a first blade respectively, the hollow wheel axle I is symmetrically provided with two first arc grooves, two ends of the hollow wheel axle II are symmetrically provided with a second blade respectively, the second blade passes through the first arc groove, the hollow wheel axle II is symmetrically provided with two second arc grooves, two ends of the hollow wheel axle III are symmetrically provided with a third blade respectively, the third blade passes through the second arc groove and the first arc groove respectively, the hollow wheel axle III is symmetrically provided with two third arc grooves, two ends of the wheel axle are symmetrically provided with a fourth blade respectively, and the fourth blade passes through the third arc groove, the second arc groove and the first arc groove respectively; and the first blade, the second blade, the third blade and the fourth blade are alternately arranged in intervals in the circumferential direction.

4. The multi-crop adaptive seed delivery and uniform seed distribution device according to claim 3, wherein the wheel axle driving device comprises a motor mounted in the box body and a master gear mounted on an output axle of the motor, the hollow wheel axle I, the hollow wheel axle II, the hollow wheel axle III and the wheel axle are all provided with a slave gear, and the slave gear engages with a corresponding master gear.

5. The multi-crop adaptive seed delivery and uniform seed distribution device according to claim 4, wherein a lower end of the hollow wheel axle I is coaxially with an obconical seed distributing head.

6. The multi-crop adaptive seed delivery and uniform seed distribution device according to claim 4, wherein outer sides of the first blade, the second blade, the third blade and the fourth blade are fixed with a soft rubber sleeve in a wrapping manner.

* * * * *